United States Patent
Gailloux et al.

(10) Patent No.: US 10,069,957 B1
(45) Date of Patent: Sep. 4, 2018

(54) TOKEN BASED CONTENT DISTRIBUTION TO WIRELESS COMMUNICATION DEVICES

(71) Applicant: Sprint Communications Company L.P., Overland Park, KS (US)

(72) Inventors: Michael A. Gailloux, Overland Park, KS (US); Jason J. Garcia, Parkville, MO (US); Lance D. Parker, Spring Hill, KS (US); Adam C. Pickett, Prairie Village, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 15/784,079

(22) Filed: Oct. 13, 2017

(51) Int. Cl.
| | |
|---|---|
| H04W 4/06 | (2009.01) |
| H04W 4/50 | (2018.01) |
| G06F 9/44 | (2018.01) |
| H04M 1/725 | (2006.01) |
| G06Q 30/06 | (2012.01) |
| H04W 4/00 | (2018.01) |
| H04L 29/08 | (2006.01) |
| G06F 8/61 | (2018.01) |

(52) U.S. Cl.
CPC .... H04M 1/72525 (2013.01); G06Q 30/0611 (2013.01); H04M 1/72544 (2013.01); H04M 1/72569 (2013.01); H04W 4/001 (2013.01); H04W 4/50 (2018.02); G06F 8/61 (2013.01); H04L 67/22 (2013.01)

(58) Field of Classification Search
CPC .............. G06F 11/30; G06F 17/30654; G06F 17/30867; G06F 8/20; G06F 8/33; G06F 8/61; G06F 9/44505; G06F 9/44526; G06F 9/50; G06F 9/547; H04W 4/06; H04W 4/50; H04W 4/001; H04M 1/72525; H04M 1/72544; H04M 1/72569; G06Q 30/0611; H04L 67/22
USPC ........................................................ 455/418
See application file for complete search history.

(56) References Cited

U.S. PATENT DOCUMENTS

| | | | | |
|---|---|---|---|---|
| 2011/0022461 | A1* | 1/2011 | Simeonov | G06Q 30/02 705/14.49 |
| 2013/0346209 | A1* | 12/2013 | Longhenry | G06Q 30/0267 705/14.64 |
| 2014/0282720 | A1* | 9/2014 | Heck | H04N 21/812 725/35 |

(Continued)

*Primary Examiner* — Nathan Taylor (57) ABSTRACT

A mobile communication device. The device comprises a processor, a mobile application that requests content to be rendered, and a content presentation mediation application comprising logic provided by a primary software development kit (SDK) and logic provided by a secondary SDK embedded in the primary SDK. The content presentation mediation application receives a request by the primary SDK from the mobile application for content to be rendered, transmits a request by the primary SKD for content to a content bidding exchange, receives a winning content bid that comprises a content token by the primary SDK from the content bidding exchange, transmits a request by the secondary SDK for content comprising the content token to a content server, receives content by the secondary SDK from the content server, and renders the content received from the content server by the secondary SKD according to rendering logic provided by the secondary SDK.

18 Claims, 9 Drawing Sheets

(56) References Cited

U.S. PATENT DOCUMENTS

| | | | |
|---|---|---|---|
| 2015/0073909 A1* | 3/2015 | Peden | G06Q 30/0276 705/14.58 |
| 2015/0379579 A1* | 12/2015 | Chiang | G06Q 30/0267 705/14.64 |
| 2016/0378578 A1* | 12/2016 | Nandakumar | G06F 9/44505 719/328 |
| 2017/0140429 A1* | 5/2017 | Cheng | G06Q 30/0256 |
| 2017/0178193 A1* | 6/2017 | Jagannath | G06Q 30/04 |
| 2017/0270495 A1* | 9/2017 | Hardin | G06Q 30/0273 |
| 2018/0018710 A1* | 1/2018 | Chang | G06Q 30/0275 |

\* cited by examiner

FIG. 9

TOKEN BASED CONTENT DISTRIBUTION TO WIRELESS COMMUNICATION DEVICES

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices such as smart phones may be used for a variety of purposes in addition to traditional voice communication. Various mobile applications may be installed on mobile communication devices that provide a variety of services. For example, various games may be downloaded and installed on mobile communication devices. Some games may communicate with game servers or other game terminals (e.g., other mobile communication devices or desktop computers) via the wireless communication links provided to the mobile communication device via cell sites. Weather monitoring and alerting mobile applications may be installed on mobile communication devices. Special interest news feeds may be provided by other mobile applications.

SUMMARY

In an embodiment, a mobile communication device is disclosed. The device comprises a processor, a non-transitory memory, a mobile application stored in the non-transitory memory, and a content presentation mediation application stored in the non-transitory memory. When executed by the processor, the mobile application requests content to be rendered. The content presentation mediation application comprises logic provided by a primary software development kit (SDK) and logic provided by a secondary SDK embedded in the primary SDK. When executed by the processor, the primary SDK receives a request from the mobile application for content to be rendered, transmits a request for content to a content bidding exchange, receives a winning content bid from the content bidding exchange, and determines that the winning content comprises a content token. When executed by the processor, the secondary SDK transmits a request for content comprising the content token to a content server, where an address of the content server is predefined in the secondary SDK, receives content from the content server, and renders the content received from the content server according to rendering logic provided by the secondary SDK.

In another embodiment, a method of providing supplemental content on a mobile communication device is disclosed. The method comprises receiving a request by a primary software development kit (SDK) executing on the mobile communication device for supplemental content to be rendered on a display of the mobile communication device, wherein the primary SDK comprises a secondary SDK embedded within it, transmitting the request for supplemental content by the primary SDK to a content bidding exchange, receiving a winning content bid by the primary SDK from the content bidding exchange, and determining by the primary SDK that the winning content bid comprises a content token. The method further comprises transferring the content token by the primary SDK to the secondary SDK, transmitting a request for content by the secondary SDK to a content server, where an address of the content server is predefined in the secondary SDK, receiving content by the secondary SDK from the content server, and rendering the content by the secondary SDK according to rendering logic provided by the secondary SDK.

In yet another embodiment, a method of providing supplemental content on a mobile communication device is disclosed. The method comprises receiving a request by a primary software development kit (SDK) executing on the mobile communication device for supplemental content to be rendered on a display of the mobile communication device, wherein the primary SDK comprises a secondary SDK embedded within it, transmitting the request for supplemental content by the primary SDK to a content bidding exchange, receiving a winning content bid by the primary SDK from the content bidding exchange, and determining by the primary SDK that the winning content bid comprises a content token that identifies the secondary SDK and creative content. The method further comprises transferring the content token by the primary SDK to the secondary SDK and rendering the creative content by the secondary SDK according to rendering logic provided by the secondary SDK, whereby creative content associated with a bidder that is unaffiliated with the secondary SDK is rendered by the logic provided by the secondary SDK.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A token based content distribution framework for a mobile communication device is taught herein. When mobile applications execute on a mobile communication device opportunities arise for presenting supplemental or auxiliary content in the window or screen that the mobile application is controlling. For example, an opportunity may arise to present supplemental content in a banner location at the top of the screen, in a side-bar location on the left or right side of the screen, or at a bottom of the screen. The supplemental content may be a public service announcement content, special interest content (e.g., content related to a sports interest, content related to an amateur astronomy special interest, content related to a cooking special interest), a notification unrelated to the executing mobile application itself, or an advertisement content. The mobile application may request a supplemental content mediation application that executes on the mobile communication device to render supplemental content in the screen of the mobile application.

The supplemental content mediation application comprises a primary software development kit (SDK) that provides some of the functions of obtaining and presenting supplemental content in the screen of a requesting mobile application on a display of the mobile communication device. For example, the primary SDK provides executable instructions, programs, or logic for interworking with a supplemental content bid exchange server to auction the opportunity to present supplemental content and receive supplemental content that won the bidding process from the supplemental content bid exchange server. The primary SDK can also provide executable instructions, programs, or logic for rendering received content in the screen of the mobile application that requested presentation of supplemental content. The primary SDK can also obtain operating system access credentials for reading from input devices and writing to output devices of the mobile communication device. The primary SDK can collect information on supplemental content that has been presented and provide this information to a server computer or data store located separately from the mobile communication device. The supplemental content mediation application and primary SDK may be associated with and managed by a wireless communication service provider.

A secondary SDK may be embedded inside of the primary SDK. The secondary SDK may be associated with a party that is different from the wireless communication service provider that controls the supplemental content mediation application and the primary SDK. This other party may be referred to in some contexts as an integrated bidder, meaning the other party has, in a limited sense, been integrated into the mobile communication device. When the integrated bidder wins a bid to provide supplemental content, the supplemental content bid exchange forwards a token that was provided with the bid by the integrated bidder's server (i.e., an integrated bidder server) to the primary SDK. When the primary SDK examines the received token, it determines that the bid response comprises a token and transfers or transmits this token to the secondary SDK. The secondary SDK reaches out to a supplemental content data store to retrieve supplemental content and renders this content on the display of the device in the screen of the subject mobile application. The secondary SDK may comprise a predefined address or reference (e.g., a domain name) that can be used to address the supplemental content data store.

In an embodiment, the token may comprise information that allows the supplemental content data store to identify the bid submitted by the integrated bidder server. That original bid may have been based on enriched information about a user of the mobile communication device, and the integrated bidder party may wish to deliver a specific supplemental content to that device based on the enriched information about the user. This may be referred to as targeting or targeted supplemental content.

The use of a secondary SDK can provide a variety of advantages. The secondary SDK can deploy a distinctive rendering technique unavailable to the primary SDK for one reason or another, for example to support a new content format. The distinctive rendering technique may be faster or produce a more agreeable visual presentation on the display. The secondary SDK may receive operating system access credentials from the primary SDK and thereby access input and output hardware of the device. The secondary SDK can therefore monitor and record details of a user interacting with the input controls of the device, for example monitoring a pressure or force of a user touch on a touchscreen of the device and/or determining a duration of time during which a user maintains a touch on the touchscreen or on an input control displayed on the touchscreen. Such details may be of interest to the integrated bidder, for example to the purpose of measuring an engagement or excitement of a user in response to the supplemental content presented on the display of the device by the secondary SDK.

In an embodiment, the wireless communication service provider may establish relationships with a plurality of different integrated bidders and may build a plurality of secondary SDKs into the primary SDK of the supplemental content mediation application. When a token associated with a first secondary SDK is received, the primary SDK would transfer that token to the first secondary SDK for rendering; when a token associated with a second secondary SDK is received, the primary SDK would transfer that token to the second secondary SDK for rendering.

Because the integrated bidder does not provide content but instead only a token, in an embodiment, the integrated bidder is able to reduce the time incurred in formulating and transmitting its bid to the supplemental content bid exchange server (i.e., the time is reduced by the time of building the bid containing the content and the time of transmitting the content). This can improve the integrated bidder's success in winning bids, as being too late to submit a bid can result in losing bids. Additionally, the supplemental content bid exchange server may be able to reduce bid auction time durations and thereby improve the computer system of the supplemental content bid exchange server. Use of the token by the integrated bidder further can be seen to reduce loads on the data network as bids are reduced by omitting content and sending only a token. While it is true that the content may ultimately be retrieved over the data network by the secondary SDK, bids of the integrated bidder that are lost do realize this network traffic savings.

In an embodiment, the integrated bidder may establish a floor bid with the supplemental content bid exchange whereby the integrated bidder provides a standing bid for any bid auction. If no other bidder exceeds this standing or floor bid, the bid is won by the integrated bidder. In some cases, the integrated bidder may maintain a floor bid with the supplemental content bid exchange and further bid on specific bid requests, for example to offer more than the floor bid when targeting a higher value opportunity.

Figure 1:
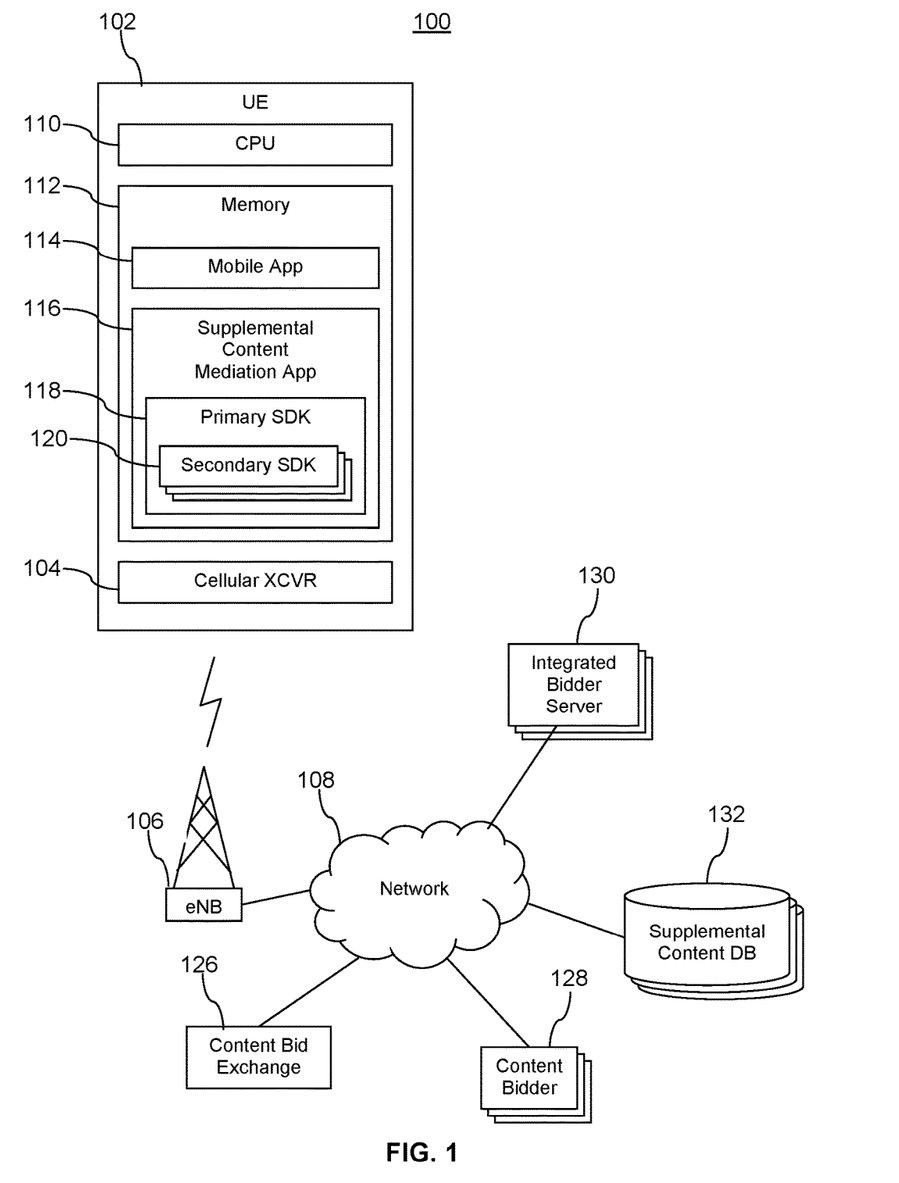
FIG. 1 is a block diagram of a communication system according to an embodiment of the disclosure.

Turning now to FIG. 1, a system 100 is described. In an embodiment, the system 100 comprises a mobile communication device 102 comprising a cellular radio transceiver 104, a cell site 106, and a network 108. The cell site 106 may provide a wireless communication link to the cellular radio transceiver 104 according to a long term evolution (LTE), a code division multiple access (CDMA), a global system for mobile communications (GSM), or a worldwide interoperability for microwave access (WiMAX) wireless communication protocol. The cell site 106 may communicatively couple the cellular radio transceiver 104 to the network 108. The network 108 may comprise one or more public network, one or more private network, or a combination thereof. While a single wireless communication device 102 and a single cell site 106 are shown in FIG. 1, there may be any number of devices 102 and cell sites 106 in the system 100. The mobile communication device 102 may be a mobile phone, a smart phone, a personal digital assistant (PDA), a wearable computer, a headset computer, a laptop computer, a notebook computer, or a tablet computer.

In an embodiment, the mobile communication device 102 further comprises a processor 110 and a memory 112. The memory 112 may comprise both non-transitory memory locations or partitions (e.g., EEPROM or flash RAM) and transitory memory locations or partitions (e.g., dynamic random access memory (DRAM)). A supplemental content mediation application 116 may be stored in the non-transitory portion of the memory 112 and comprises a primary software development kit (SDK) 118 which itself comprises at least one secondary SDK 120. In an embodiment, the primary SDK 118 may comprise the entirety of the supplemental content mediation application 116. Said in other words, in an embodiment there is no supplemental content mediation application 116 present in the mobile communication device 102 and all functions and capabilities attributed herein to the supplemental content mediation application 116 are instead provided by the primary SDK 118. In embodiment, the mobile communication device 102 may further comprise a short range radio transceiver (not shown), such as a WiFi radio transceiver, that is communicatively coupled to the network 108 by an access point (not shown).

The system 100 further comprises a supplemental content bid exchange 126, a plurality of supplemental content bidders 128, one or more integrated bidding servers 130, and one or more supplemental content data stores 132. In some contexts the supplemental content bid exchange 126 may be referred to as a content bid exchange or a bid exchange and the supplemental content bidders 128 may be referred to as content bidders or bidders. The supplemental content mediation application 116 may provide an application programming interface (API) that is invoked by the mobile application 114 when it experiences an opportunity to present supplemental content, for example in a banner location or side-bar location within a screen on display of the device 102. The opportunity may occur when the mobile application 114 is first brought into service, during a transition within an on-going session of the mobile application 114, or upon some other event. The mobile application 114 may be a mobile game application, a browser, a weather monitoring and/or alerting application, a virtual concierge application, a news feed application, or another mobile application. When the mobile application 114 invokes the API of the supplemental content mediation application 116, the primary SDK 118 (which is a part of the mediation application 116) requests that the opportunity to present supplemental content be auctioned by the supplemental content bid exchange 126. The supplemental content bid exchange 126 and the supplemental content bidders 128 may be implemented as computer systems. Computers are discussed further herein after.

The supplemental content bid exchange 126 sends a bid request pursuant to the supplemental content request to the supplemental content bidders 128. Typically the supplemental content bidders 128 respond quickly, if they wish to respond to the bid request, because the time budget from initial request from the supplemental content mediation application 116 to rendering the content on the mobile communication device 102 is desirably a short period of time, for example less than 500 ms or even less than 250 ms. The supplemental content bid exchange 126 may provide some contextual information about the bid request, such as any available demographic information about a user of the mobile communication device 102, a make and model of device 102, location information, and the like. The supplemental content bidders 128 may use the contextual information, if available, to determine if they wish to bid and possibly how much to bid. When supplemental content bidders 128 provide a bid response, the bid response typically comprises the bid amount as well as the supplemental content itself.

The supplemental content bid exchange 126 determines a winner of the bid auction and transmits the winning bid to the supplemental content mediation application 116. Transmitting the winning bid may be referred to in some contexts as transmitting a bid response. Transmitting the winning bid may comprise transmitting content (e.g., from a supplemental content bidder 128 that is not associated with an integrated bidder server 130), transmitting a token (e.g., from a supplemental content bidder 128 that is associated with an integrated bidder server 130), or both content and a token (e.g., from a supplemental content bidder 128 that is not associated with an integrated bidder server 130 but wishes its content to be rendered by the rendering logic of the secondary SDK 120 associated with the provided token, as described further hereinafter). In the case of an integrated bidder server 130, however, the bid response comprises a bid amount and a token rather than a supplemental content. The supplemental content bid exchange 126 returns the bid response to the primary SDK 118.

The primary SDK 118 parses the bid response. If the bid response comprises a token, the primary SDK 118 identifies which secondary SDK 120 the token is associated to and sends the token to that secondary SDK 120. If the bid response is a conventional bid response (i.e., contains no token), the primary SDK 118 renders the supplemental content in the screen of the mobile application 114.

Figure 2:
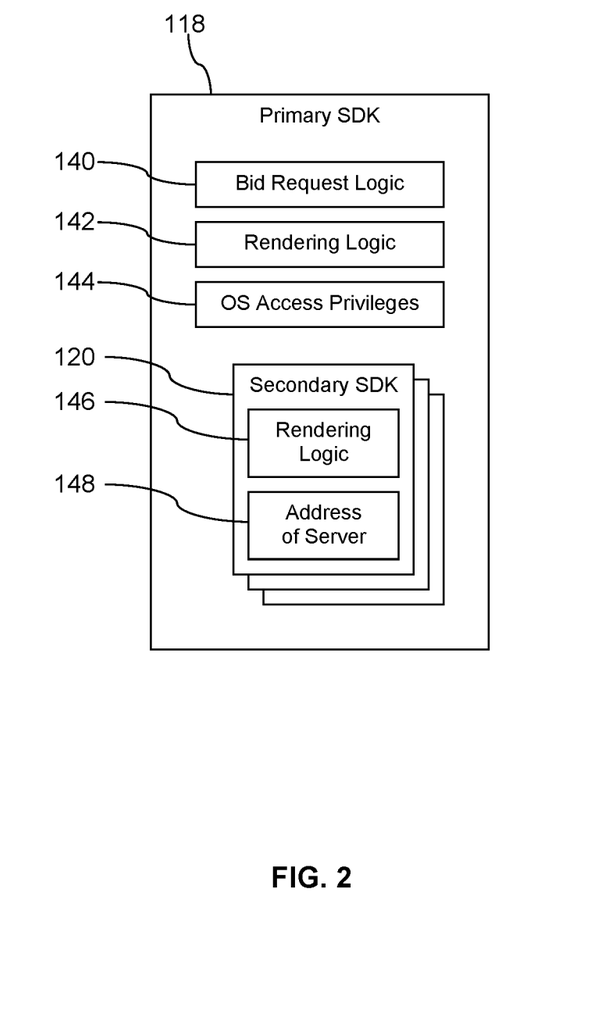
FIG. 2 is a block diagram of a software development kit (SDK) according to an embodiment of the disclosure.

Turning now to FIG. 2, further details of the primary SDK 118 are described. The primary SDK 118 comprises at least one secondary SDK 120. In some contexts the secondary SDK 120 may be said to be embedded in the primary SDK 118. There may be two or more secondary SDKs 120 embedded in the primary SDK 118. The primary SDK 118 further comprises bid request logic 140, rendering logic 142, and operating system access privileges 144. Each secondary SDK 120 may comprise rendering logic 146 and an address of a server 148, for example an address of a server mediating access to a supplemental content data store 132. The primary SDK 118 may be configured with operating system privileges 144 that enable it to obtain access to low-level details of hardware components of the mobile communication device 102, for example to access device drivers of input and output devices. Because the secondary SDK 120 is embedded in the primary SDK 118, the secondary SDK 120 is able to use the same operating system access privileges 144 as are available to the primary SDK 118.

The rendering logic 142 of the primary SDK 118 may provide instructions for presenting supplemental content on a display of the mobile communication device 102. The rendering logic 142 of the primary SDK 118 may support a plurality of different file formats. For example the rendering logic 142 may be capable of rendering video on the display, static graphical image files on the display, and other formats. The rendering logic 146 of the secondary SDK 120 may be different from the rendering logic of the primary SDK 118. The rendering logic 146 of the secondary SDK 120 may be capable of rendering conventional content file formats but also may be capable of rendering new and/or proprietary file formats. As used herein, rendering means presenting supplemental content on the display of the mobile communication device 102 and may include further playing an audio portion of the supplemental content, for example through speakers of the device 102 or through an earpiece jack receptacle.

When the bid response received by the primary SDK 118 from the supplemental content bid exchange 126 is a token, the token is transferred or transmitted by the primary SDK 118 to the associated secondary SDK 120. The token may comprise an identity of the secondary SDK 120. The secondary SDK 120 may send a content request to the supplemental content data store 132 based on the address of the server 148. The content request may comprise one or more elements of the token or may comprise the entire token. The supplemental content data store 132 and/or a server that mediate access to the supplemental data store 132 may use the token to select specific supplemental content to be returned to the secondary SDK 120. The token may provide a link or pointer to contextual information provided by the supplemental content bid exchange 126 when requesting bids during the auction. The token may provide a link or pointer to specific supplemental content that had been identified when the integrated bidder server 130 was formulating the bid response which won the auction. The supplemental content data store 132 returns supplemental content to the secondary SDK 120, and the secondary SDK 120 renders the returned supplemental content using the rendering logic 146 of the secondary SDK 120 and does not need to retrieve content at 176.

Figure 3:
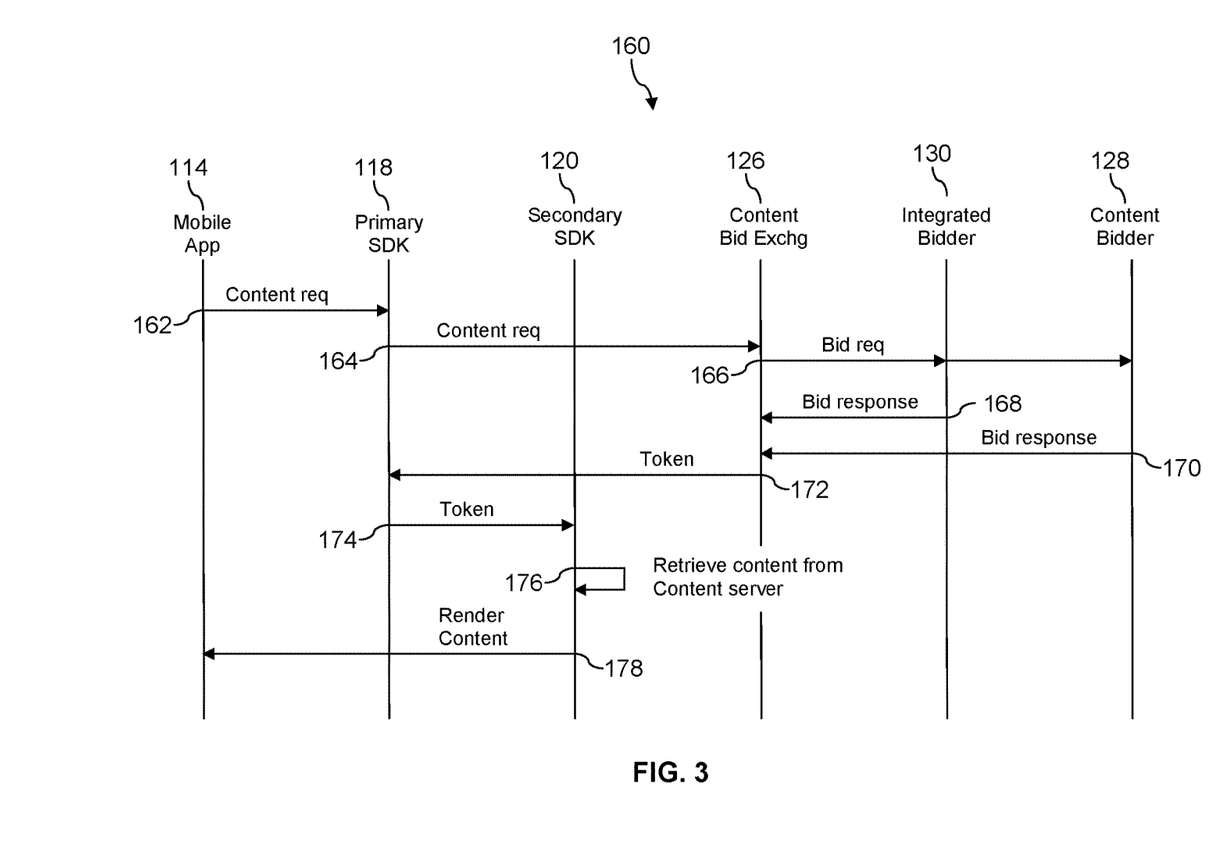
FIG. 3 is a message sequence diagram according to an embodiment of the disclosure.

Turning now to FIG. 3, a message sequence 160 is described. The mobile application 114 sends a supplemental content request message 162 to the primary SDK 118 in the supplemental content mediation application 116. The mobile application 114 may employ an API of the supplemental content mediation application 116 to send the content request message 162. The primary SDK 118 sends a supplemental content request message 164 to the supplemental content bid exchange 126. The secondary content bid exchange 126 sends a supplemental content bid request to one or more integrated bidders 130 and to one or more supplemental content bidders 128. In some circumstances, the supplemental content bid request may comprise contextual information such as demographic information about the user of the device 102, location of the device 102, a make and model of the device 102, or other context.

The integrated bidder 130 may send a bid response message 168 to the supplemental content bid exchange 126 which comprises a token but no content. The integrated bidder 130 may store the token, any associated contextual information provided in the bid request message 166, and possibly a link or reference to supplemental content that the integrated bidder 130 has identified to render on the device 102 in the event that it wins the bid. One or more supplemental content bidders 128 may send a bid response 170 to the supplemental content bid exchange 126. The bid response 170 may comprise a bid as well as the supplemental content itself. In an embodiment, the bid response 170 transmitted by a supplemental content bidder 128 may comprise a bid, the supplemental content, and a token that identifies one of the secondary SDKs 120. In this case, as discussed further below, the secondary SDK 120 may render the supplemental content provided by the supplemental content bidder 128 in the bid response 170 using the rendering logic 146 of the secondary SDK 120. In this way, a third party that is not affiliated with the integrated bidder may be able to have its supplemental content rendered with what may be a preferred or more state-of-the-art rendering logic 146 provided for general use by a secondary SDK 120.

In the scenario illustrated by the message sequence 160 of FIG. 3, the supplemental content bid exchange 126 selects the bid response 168 of the integrated bidder server 130 and sends a message 172 containing the token submitted in bid response 168 by the integrated bidder server 130 to the primary SDK 118. The primary SDK 118 forwards the token to the secondary SDK 120. The secondary SDK 120 retrieves content from the supplemental content data store 132 and/or server at 176. The secondary SDK 120 may access the server address 148 stored in the secondary SDK 120 to learn what address to request content from. The content request may comprise an identifier that allows the supplemental content data store 132 to link the content request to the bid request 166, for example a token serial number of a bid request serial number or other identifier. The supplemental content data store 132 may use the identifier to select supplemental content that has been selected based on contextual information provided by the supplemental content bid exchange 126 in the bid request 166.

At 178, the secondary SDK 120 renders the supplemental content. This may involve invoking a display device driver application programming interface (API) provided by an operating system of the device 102 or commanding the display hardware directly by the secondary SDK 120. In an embodiment, the secondary SDK 120 may receive a token and content from the primary SDK 118, for example when a supplemental content bidder 128 (e.g., a third party and not integrated bidder) provides a token and supplemental content in its bid response 168 and wins the bid. In this case, the secondary SDK 120 then renders the supplemental content provided with the token by the primary SDK 118.

The secondary SDK 120 may further monitor user interactions with the supplemental content that it has rendered on the device 102. For example, the secondary SDK 120 may record a pressure or force of a user input to a touchscreen of the device 102, a time duration during which the user input to the touchscreen continues, or other interactions of the user with the touchscreen. The secondary SDK 120 may bundle information about these user inputs and send the bundled information back to a server or data store (not shown) managed by the integrated bidder. The secondary SDK 120 is enabled to track such additional information because it is directly engaged with the input and output devices of the device 102. This capability may typically not be available to third part bidders who are not integrated with the primary SDK 118.

Figure 4:
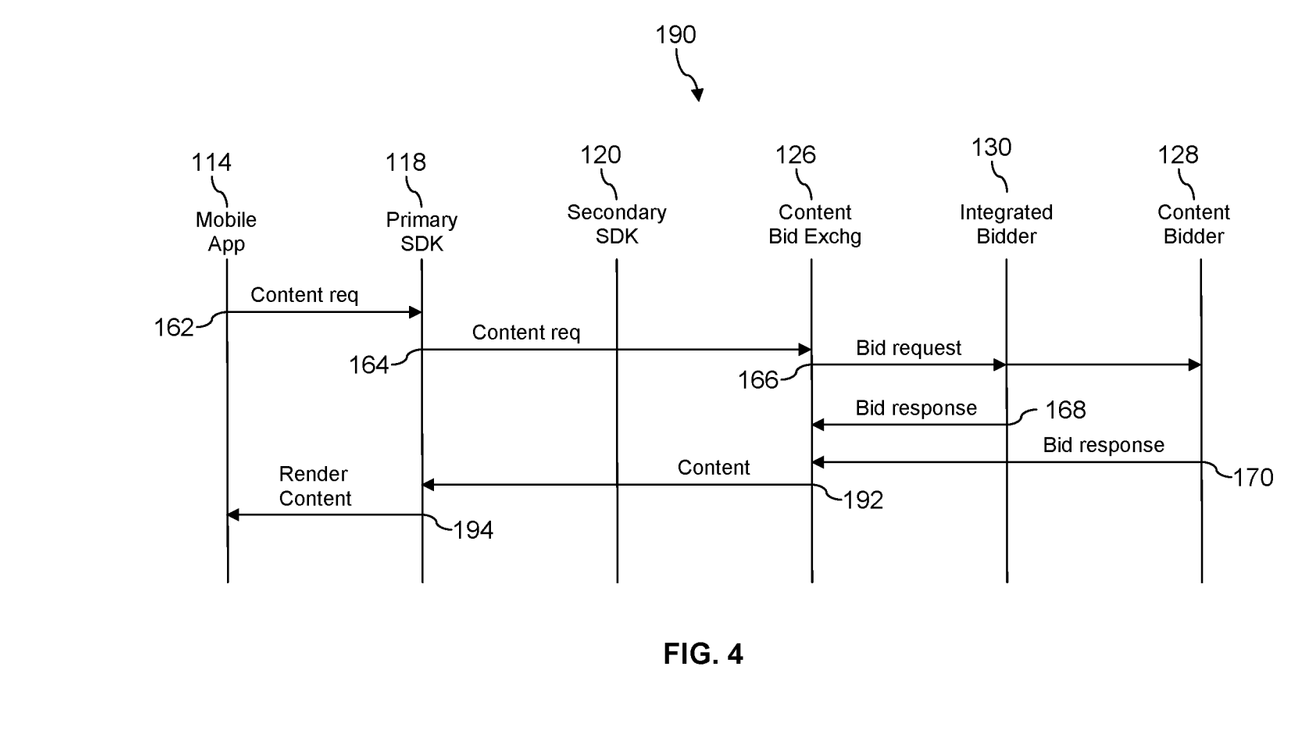
FIG. 4 is another message sequence diagram according to an embodiment of the disclosure.

Turning not to FIG. 4, a message sequence 190 is described. The message sequence 190 is identical to the message sequence 160, up to the point that bid responses 168, 170 are transmitted up to the supplemental content bid exchange 126. In the scenario depicted in message sequence 190, however, the bid response 170 from the supplemental content bidder 128 (i.e., a third party, non-integrated bidder) wins the bid. The supplemental content bid exchange 126 sends a supplemental content message 192 containing the supplemental content of the supplemental content bidder 128 to the primary SDK 118, and the primary SDK 118 renders the supplemental content on the device 102. The supplemental content message 192 may be referred to in some contexts as a bid response.

Figure 5:
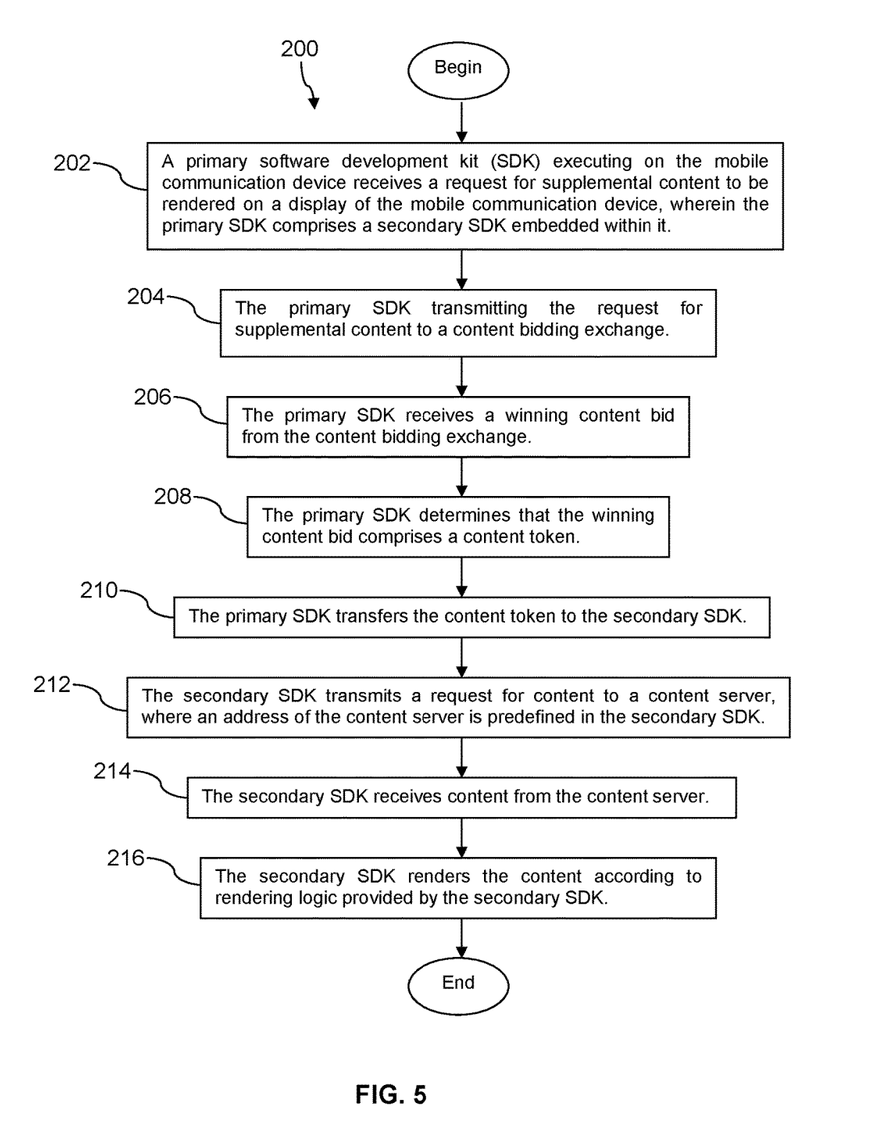
FIG. 5 is a flow chart of a method according to an embodiment of the disclosure.

Turning now to FIG. 5, a method 200 is described. At block 202, a primary software development kit (SDK) executing on the mobile communication device receives a request for supplemental content to be rendered on a display of the mobile communication device, wherein the primary SDK comprises a secondary SDK embedded within it. At block 204, the primary SDK transmitting the request for supplemental content to a content bidding exchange. At block 206, the primary SDK receives a winning content bid from the content bidding exchange.

At block 208, the primary SDK determines that the winning content bid comprises a content token. At block 210, the primary SDK transfers the content token to the secondary SDK. At block 212, the secondary SDK transmits a request for content to a content server, where an address of the content server is predefined in the secondary SDK.

At block 214, the secondary SDK receives content from the content server. At block 216, the secondary SDK renders the content according to rendering logic provided by the secondary SDK.

Figure 6:
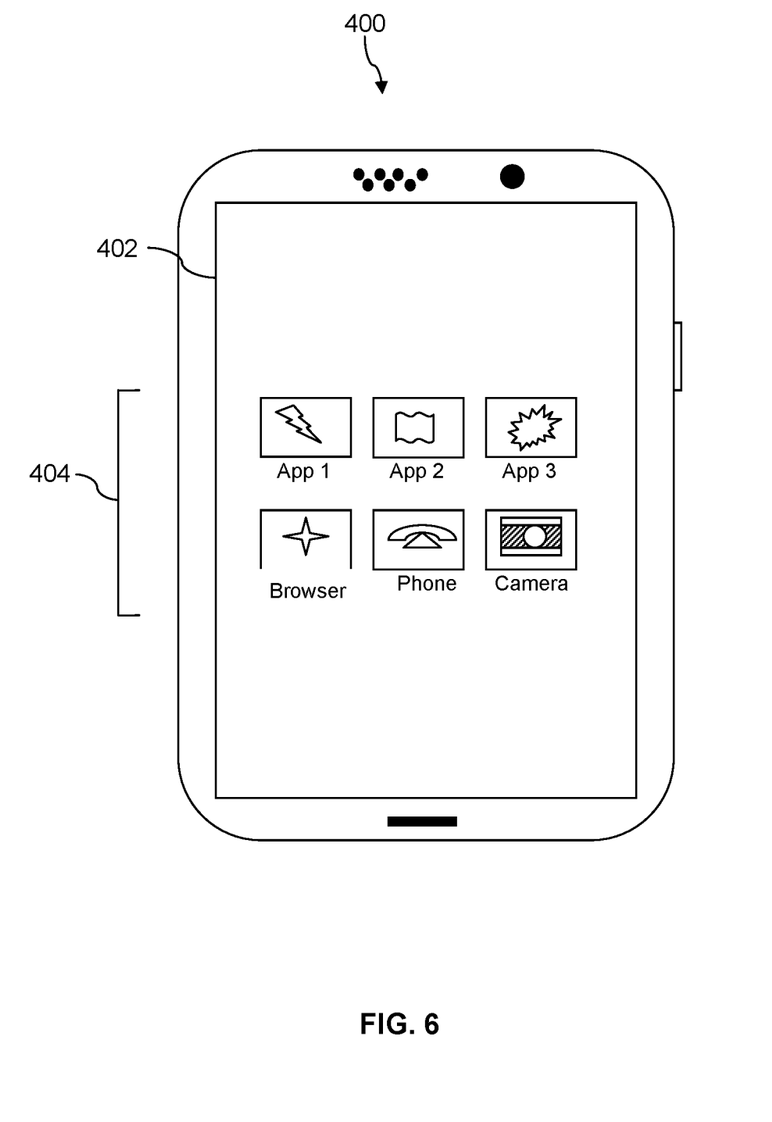
FIG. 6 is an illustration of a mobile communication device according to an embodiment of the disclosure.

FIG. 6 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touch-screen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 7:
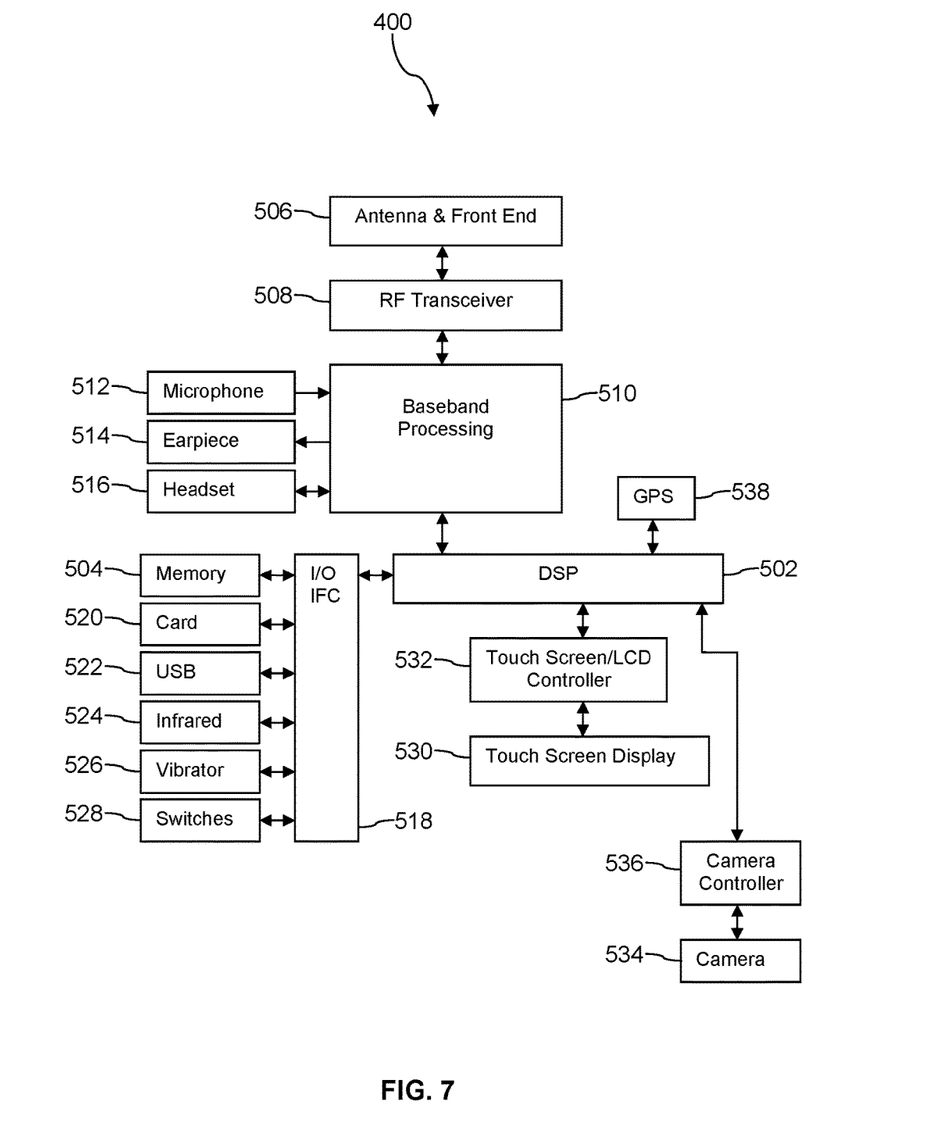
FIG. 7 is a block diagram of a hardware architecture of a mobile communication device according to an embodiment of the disclosure.

FIG. 7 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 8A:
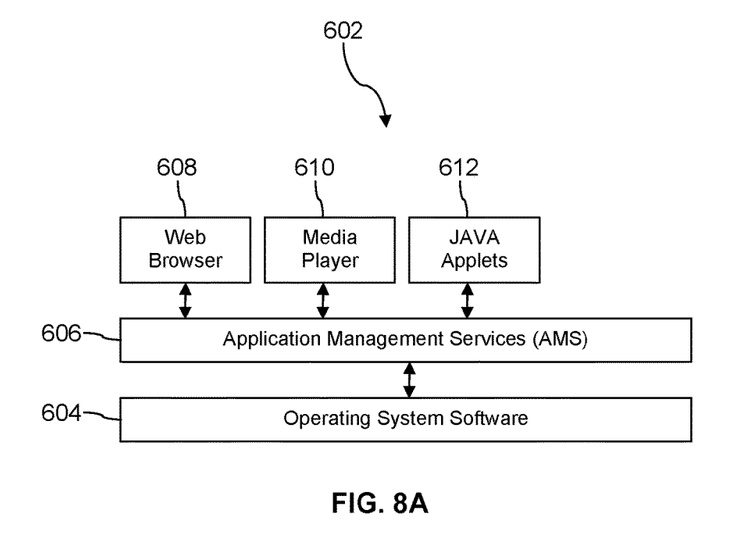
FIG. 8A is a block diagram of a software architecture according to an embodiment of the disclosure.

FIG. 8A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 8A are a web browser application 608, a media player application 610, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 8B:
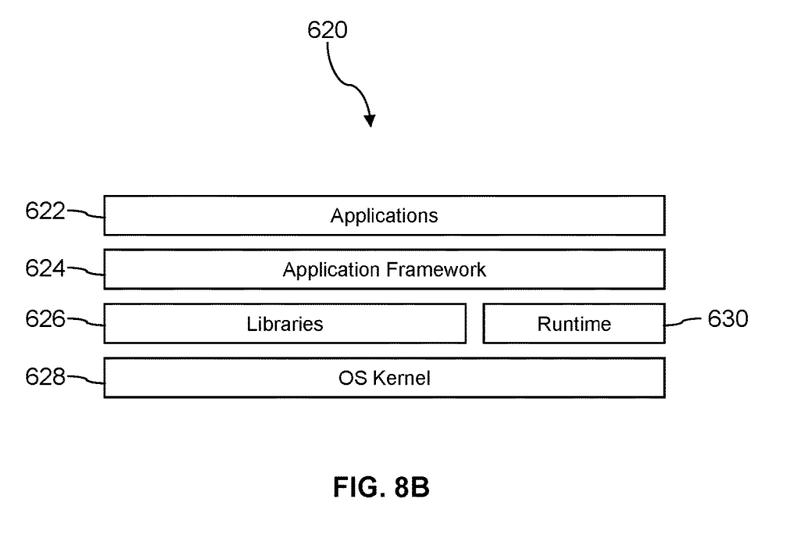
FIG. 8B is a block diagram of another software architecture according to an embodiment of the disclosure.

FIG. 8B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 9:
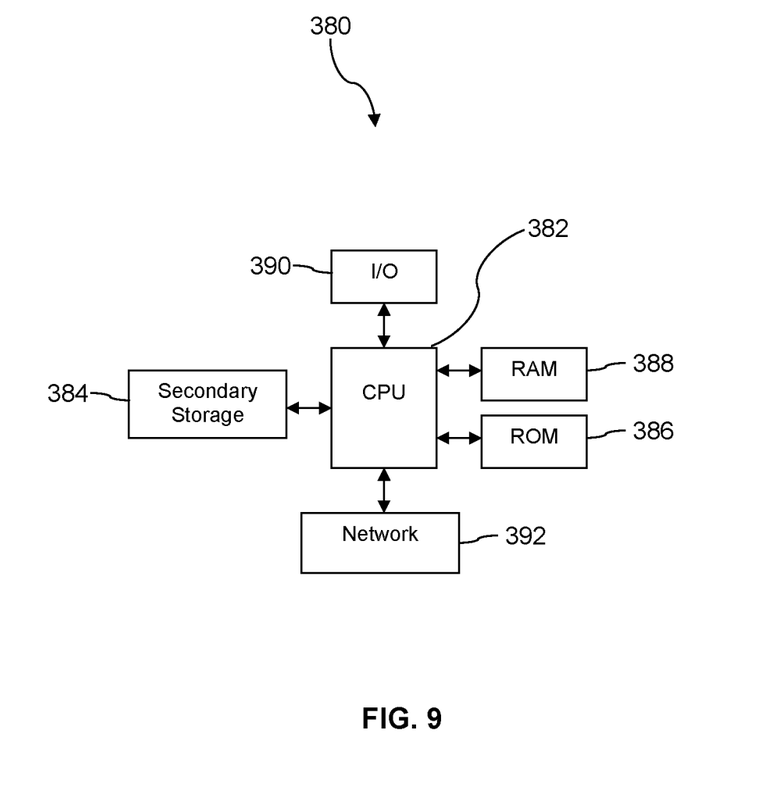
FIG. 9 is a block diagram of a computer system according to an embodiment of the disclosure.

FIG. 9 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A mobile communication device, comprising:
a processor;
a non-transitory memory;
a mobile application stored in the non-transitory memory that, when executed by the processor, requests content to be rendered; and
a content presentation mediation application stored in the non-transitory memory and comprising logic provided by a primary software development kit (SDK), logic provided by a secondary SDK embedded in the primary SDK, and logic provided by a second secondary SDK embedded in the primary SDK, that, when executed by the processor:
receives a request by the primary SDK from the mobile application for content to be rendered,
transmits a request by the primary SKD for content to a content bidding exchange,
receives a winning content bid by the primary SDK from the content bidding exchange,
determines by the primary SDK that the winning content comprises a content token,
transmits a request for content by the secondary SDK comprising the content token to a content server, where an address of the content server is predefined in the secondary SDK,
receives content by the secondary SDK from the content server,
renders the content received from the content server by the secondary SKD according to rendering logic provided by the secondary SDK,
receives a second request for content by the primary SDK,
transmits the second request for content by the primary SDK to the content bidding exchange,
receives a second winning content bid by the primary SDK from the content bidding exchange,
determines by the primary SDK that the winning content bid comprises a second content token associated with the second secondary SDK,
transmits a request for content by the second secondary SDK to a second content server, where an address of the second content server is predefined in the second secondary SDK,
receives content by the second secondary SDK from the second content server, and
renders the content received from the second content server by the second secondary SDK according to rendering logic provided by the second secondary SDK.

2. The mobile communication device of claim 1, wherein the mobile communication device is one of a mobile phone, a smart phone, a personal digital assistant (PDA), a wearable computer, a headset computer, a laptop computer, a notebook computer, or a tablet computer.

3. The mobile communication device of claim 1, further comprising a cellular radio transceiver that is operable to communicate with a cell site according to a long term evolution (LTE), a code division multiple access (CDMA), a global system for mobile communications (GSM), or a worldwide interoperability for microwave access (WiMAX) wireless communication protocol.

4. The mobile communication device of claim 1, wherein the content presentation mediation application further:
stores information about inputs to a user interface of the mobile communication device by the secondary SDK; and
transmits the information about inputs by the secondary SDK to a server computer.

5. The mobile communication device of claim 4, wherein the information about inputs to the user interface comprises information about a force applied to the user interface.

6. The mobile communication device of claim 1, wherein the mobile application is a weather monitoring mobile application.

7. The mobile communication device of claim 1, wherein the mobile application is a gaming mobile application.

8. A method of providing supplemental content on a mobile communication device, comprising:
receiving a request by a primary software development kit (SDK) executing on the mobile communication device for supplemental content to be rendered on a display of the mobile communication device, wherein the primary SDK comprises a secondary SDK and a second secondary SDK embedded within it;
transmitting the request for supplemental content by the primary SDK to a content bidding exchange;
receiving a winning content bid by the primary SDK from the content bidding exchange;
determining by the primary SDK that the winning content bid comprises a content token;
transferring the content token by the primary SDK to the secondary SDK;
transmitting a request for content by the secondary SDK to a content server, where an address of the content server is predefined in the secondary SDK;
receiving content by the secondary SDK from the content server;
rendering the content by the secondary SDK according to rendering logic provided by the secondary SDK;
receiving a second request for supplemental content by the primary SDK;
transmitting the second request for supplemental content by the primary SDK to the content bidding exchange;
receiving a second winning content bid by the primary SDK from the content bidding exchange;
determining by the primary SDK that the winning content bid comprises a second content token associated with the second secondary SDK;
transferring the second content token by the primary SDK to the second secondary SDK;
transmitting a request for content by the second secondary SDK to a second content server, where an address of the second content server is predefined in the second secondary SDK;
receiving content by the second secondary SDK from the second content server; and
rendering the content received from the second content server by the second secondary SDK according to rendering logic provided by the second secondary SDK.

9. The method of claim 8, further comprising
receiving a third request by the primary software development kit (SDK);
transmitting the third request for supplemental content by the primary SDK to the content bidding exchange;
receiving a third winning content bid by the primary SDK from the content bidding exchange;
determining by the primary SDK that the third winning content bid comprises a third content token identifying the secondary SDK and content to be rendered;
transferring the third content token and the content to be rendered by the primary SDK to the secondary SDK; and
rendering the content transferred by the primary SDK by the secondary SDK according to rendering logic provided by the secondary SDK.

10. The method of claim 8, further comprising:
monitoring inputs to a user interface of the mobile communication device by the secondary SDK;
storing information about the inputs by the secondary SDK; and
transmitting the information about inputs by the secondary SDK to a server computer.

11. The method of claim 10, wherein the information about the inputs comprises a pressure applied to the input.

12. The method of claim 10, wherein the information about the inputs comprises how long an input is maintained.

13. The method of claim 8, wherein the mobile communication device is one of a mobile phone, a smart phone, a personal digital assistant (PDA), a wearable computer, a headset computer, a laptop computer, a notebook computer, or a tablet computer.

14. The method of claim 8, a cellular radio transceiver that is operable to communicate with a cell site according to a long term evolution (LTE), a code division multiple access (CDMA), a global system for mobile communications (GSM), or a worldwide interoperability for microwave access (WiMAX) wireless communication protocol.

15. The method of claim 8, wherein the supplemental content is a public service announcement content, a special interest content, or an advertisement content.

16. A method of providing supplemental content on a mobile communication device, comprising:
receiving a request by a primary software development kit (SDK) executing on the mobile communication device for supplemental content to be rendered on a display of the mobile communication device, wherein the primary SDK comprises a secondary SDK embedded within it;
transmitting the request for supplemental content by the primary SDK to a content bidding exchange;
receiving a winning content bid by the primary SDK from the content bidding exchange;
determining by the primary SDK that the winning content bid comprises a content token that identifies the secondary SDK and creative content;
transferring the content token by the primary SDK to the secondary SDK;
rendering the creative content by the secondary SDK according to rendering logic provided by the secondary SDK, whereby creative content associated with a bidder that is unaffiliated with the secondary SDK is rendered by the logic provided by the secondary SDK;
receiving a second request by the primary SDK;
transmitting the second request for supplemental content by the primary SDK to the content bidding exchange;
receiving a second winning content bid by the primary SDK from the content bidding exchange;
determining by the primary SDK that the winning content bid comprises a second content; and
rendering the second content by the primary SDK according to rendering logic provided by the primary SDK.

17. The method of claim 16, wherein the rendering logic of the secondary SDK interacts with an output of the mobile communication device using operating system access privileges extended to it by the primary SDK.

18. The method of claim 16, wherein the mobile communication device is one of a mobile phone, a smart phone, a personal digital assistant (PDA), a wearable computer, a headset computer, a laptop computer, a notebook computer, or a tablet computer.

* * * * *